United States Patent Office 3,224,341
Patented Dec. 21, 1965

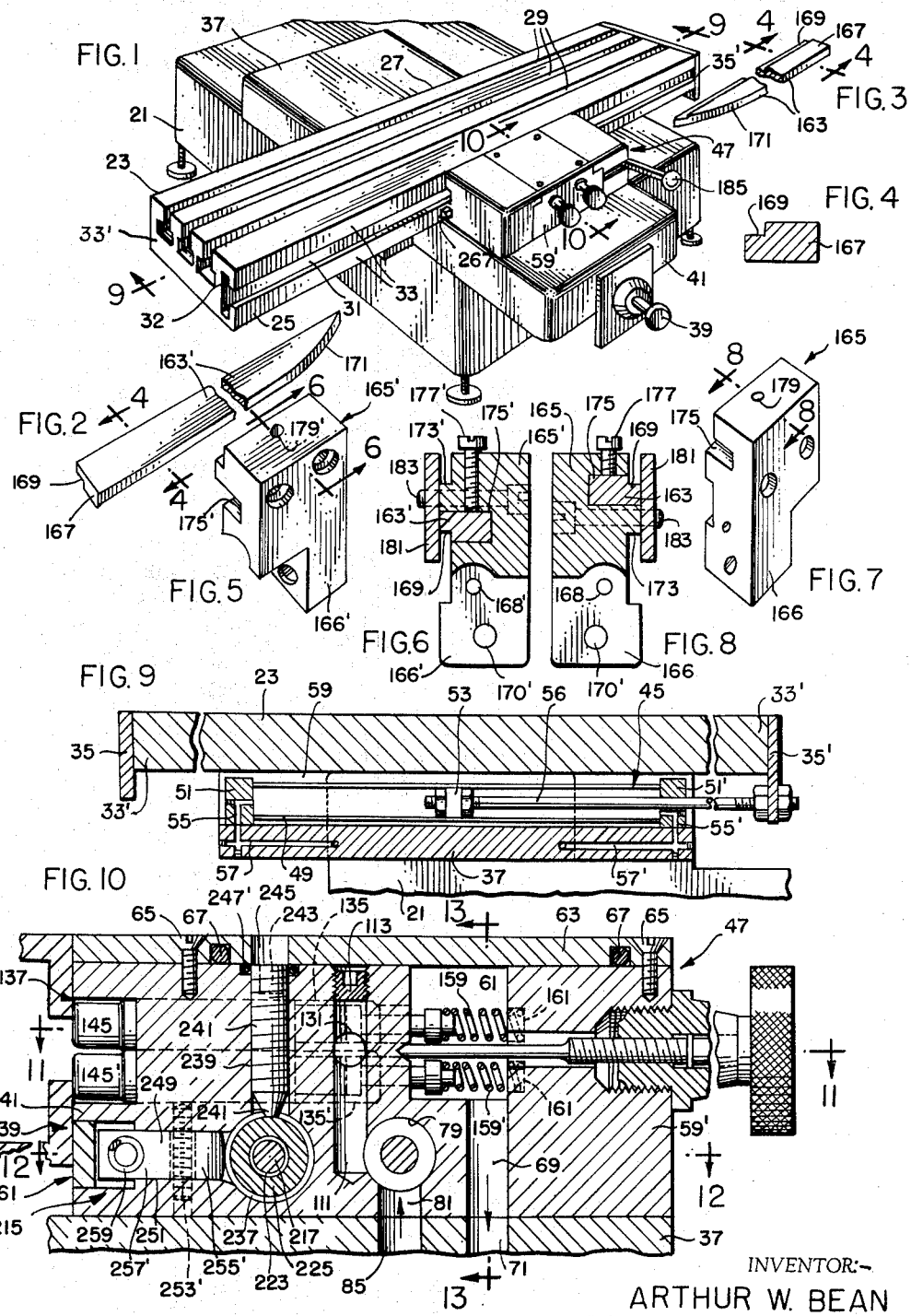
Dec. 21, 1965   A. W. BEAN   3,224,341
HYDRAULIC CONTROL APPARATUS
Filed Nov. 9, 1962   3 Sheets-Sheet 1
INVENTOR:—
ARTHUR W. BEAN
BY:—
Marzall, Johnston, Cook & Root
ATT'YS

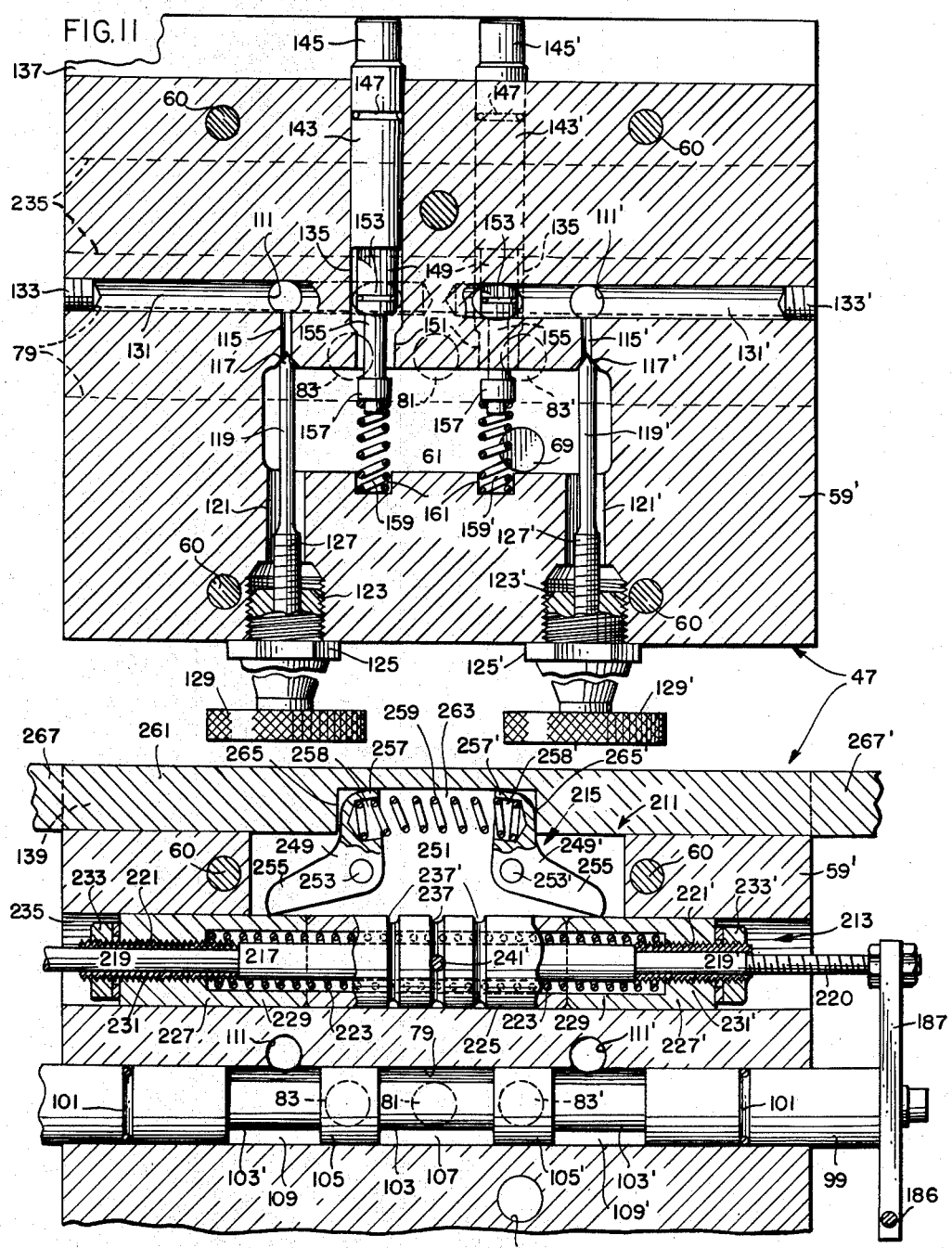

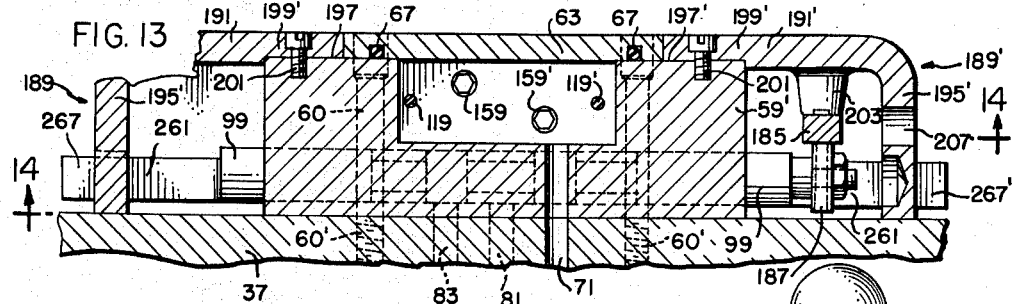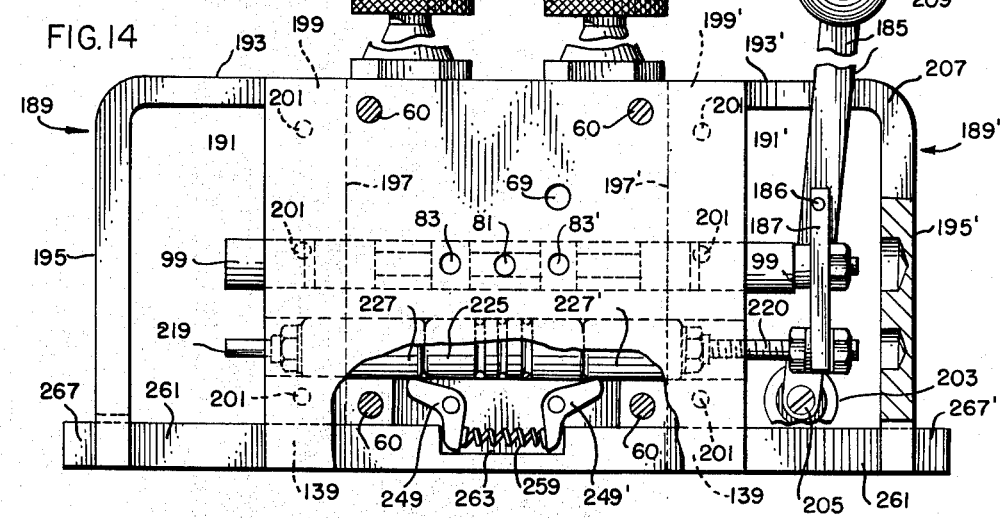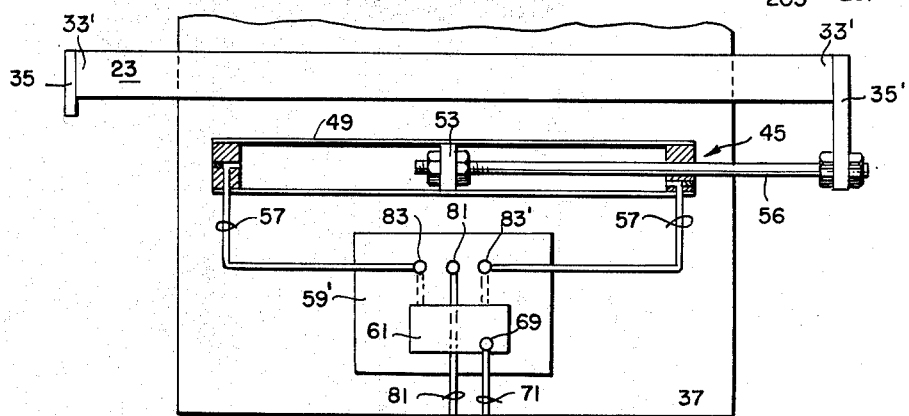

3,224,341
HYDRAULIC CONTROL APPARATUS
Arthur W. Bean, Marengo, Ill., assignor to
Elmer M. Melahn, Algonquin, Ill.
Filed Nov. 9, 1962, Ser. No. 236,604
9 Claims. (Cl. 91—358)

The present invention relates in general to hydraulic control apparatus, and has more particular reference to improved means for controlling the operation of milling machines and like mechanism embodying a component, such as the work carriage of a milling machine, that is movable in opposite directions, as in the performance of the feed and return strokes of a milling machine work carriage, the invention pertaining more especially to mechanism that is adjustable to control such feed and return strokes of a movable machine component at any desired speed within the range of the control apparatus, and at such different speeds as may be desired during different portions of a stroke.

An important object of the invention is to provide improved fluid pressure apparatus for actuating a movable part or parts of a machine; a further object being to provide apparatus that is readily adjustable to determine not only the displacement or length of stroke through which the part is moved, but also the speed at which the part is moved; a still further object being to provide apparatus that is adjustable to shift the movable parts at various desired speeds during the course of a controlled stroke.

Another important object is to provide apparatus of the character mentioned that is of relatively simple, rugged construction and adapted for ready attachment upon existing machines to be controlled.

Among the numerous other important objects of the invention is to provide apparatus particularly well suited for controlling the reciprocal movements of work-carrying members or tables in milling machines; to provide apparatus that may be quickly and easily adjusted to attain relatively slow feed movements of an operating part in either direction, with rapid return; and, in general, to improve the flexibility of speed control of feeding movement at any desired rate and at various rates in either direction.

The foregoing and numerous other important objects, advantages and inherent functions of the invention will become apparent as the same is more fully understood from the following description, which, taken in conjunction with the accompanying drawings, discloses a preferred embodiment of the invention.

Referring to the drawings:

FIG. 1 is a perspective view showing a portion of a milling machine embodying a work-carrying table and fluid pressure actuated apparatus for controlling the operating movement of the table, in accordance with the teachings of the present invention;

FIGS. 2 and 3 are perspective views of cam bars adapted for mounting on the table in position to control the operation of the apparatus of the present invention;

FIG. 4 is a sectional view taken substantially along the line 4—4 in FIGS. 2 and 3;

FIGS. 5 and 7 are perspective views of brackets for mounting the cam bars of FIGS. 2 and 3 upon the table to be controlled;

FIGS. 6 and 8 are sectional views respectively taken substantially along the line 6—6, in FIG. 5, and the line 8—8, in FIG. 7;

FIGS. 9 and 10 are sectional views taken substantially along the lines 9—9 and 10—10 in FIG. 1;

FIGS. 11, 12 and 13 are sectional views respectively taken substantially along the lines 11—11, 12—12 and 13—13 in FIG. 10;

FIG. 14 is a sectional view taken along the line 14—14 in FIG. 13; and

FIG. 15 is a diagrammatic view of the apparatus.

To illustrate the invention, the drawings show a portion of a conventional milling machine including a frame 21 for supporting a conventional work-carrying table 23 for movement in mutually normal directions with respect to the work cutting or forming head of the milling machine, which is not shown in the drawings. As shown, the table 23 is of elongated configuration, having front and rear longitudinal sides 25 and 27, and a top formed with conventional T-slots 29 to facilitate the anchorage of work material thereon in position for engagement with the working head of the milling machine. A conventional T-slot 31 providing an enlarged interior cavity 32 and spaced flanges 33, defining the slot 31 therebetween, is also formed along the front side of the table, the opposite ends 33' of which are preferably fitted with cover plates 35 which may be bolted thereto in position enclosing the opposite ends of the T-slots 29 and 31.

The frame or base 21 is formed to support a saddle or carriage 37, upon which the table 23 is in turn mounted. To this end, the saddle 37 may be supported in suitable slideways on the frame 21 for movement thereon in a direction transversely of the table 23, that is to say, normally of its longitudinal sides 25 and 27, movement of the saddle on the frame being accomplished in any suitable or preferred fashion, as by conventional drive screw means of the sort controlled by a manually actuated knob or handle 39 mounted on the saddle 37, as at its forward end 41. The saddle 37 may be formed with conventional, transversely extending bearing guideways and the table with dependent ribs extending in said guideways to thereby support the work table medially on the carriage for movement thereon in a direction at right angles to the direction of saddle movement on the support frame.

It will be seen from the foregoing that the table 23 may be disposed in any desired adjusted position, upon the frame 21, in a direction normal to the longitudinal sides 25 and 27, of the table, by operating the knob 39 to shift the saddle or table carriage 37 until the desired position of adjustment is reached. Thereafter the table 23 may be moved on and transversely of the saddle by operation of the control apparatus of the present invention.

The control apparatus may conveniently include a hydraulic table driving cylinder and piston unit 45 mounted on the saddle or carriage 37, beneath the table, and drivingly connected therewith. Means forming a suitable supply source of hydraulic fluid under pressure, for the operation of the unit 45, may be provided, together with an adjustable fluid flow control unit 47, which may be mounted on the saddle in readily accessible position, as at the front side 25 of the table to be controlled; and suitable conduit means may be provided for interconnecting the control unit with the cylinder and piston unit and with the supply source of hydraulic fluid.

As shown, the unit 45 may comprise a cylinder 49 having end closure plates or blocks 51, 51', and a piston 53 longitudinally movable in either direction in the cylinder, between said end closure blocks, in response to the delivery of hydraulic fluid under pressure, into the cylinder upon one side of the piston, and discharge of fluid from the cylinder, on the other side of the piston, and vice versa, as through ducts 55, 55', formed in the end closure blocks 51 and 51'. The piston may be drivingly connected with the table by means of a piston rod 56, connected to the piston and to one of the table end plates 35, and extending through and slidingly supported on the end block 51'.

The cylinder 49 may be fastened firmly upon the carriage 37 in position extending in a transverse channel 59, as by bolting the end blocks 51, 51', to the carriage in said channel, to thereby mount the cylinder beneath and parallel to the table 23, and to connect the ducts 55, 55', with hydraulic fluid supply and discharge ducts 57, 57', formed in the carriage. These supply and discharge ducts may extend in the carriage, from the ducts 55, 55', to connect with the flow control unit 47. To this end, the fluid supply and discharge ducts 57, 57', may open upon the surface of the carriage 37, beneath the unit 47, in position for connection with fluid channels formed in said unit.

The flow control unit 47, as shown, may comprise a generally rectangular block 59', preferably of metal such as steel, bolts 60 or other suitable fastening means being provided for anchoring the block upon the carriage 37, with the rear side of the block facing the front side 25 of the table to be controlled, said bolts extending in channels formed through the block between the top and bottom sides of the block, and having threaded engagement in sockets 60' formed in the table.

The block 59' is provided with a chamber or cavity 61, preferably having generally rectangular configuration and disposed medially between the opposite side walls of the block. The chamber is preferably elongated in a direction parallel with the front wall of the block and may be disposed somewhat closer to the front wall than to the rear or table facing wall of the block. The bottom of the chamber 61 also may extend substantially medially between the top and bottom faces of the block, while the top of the chamber opens upon the upper surface of the block. A cover plate 63 of steel, or any suitable material, may be secured, as by means of fastening screws 65, in position overlying the upper face of the block, in order to sealingly close the open top of the chamber 61. A circular sealing gasket 67 extending in a groove formed in said cover plate 63 may be provided to seal with the upper surface of the block around the open top of the chamber 61.

A fluid outlet channel 69 may be formed in the block between the bottom of the chamber 61 and the lower face of the block 59', in position to connect with an outlet duct 71 formed in the saddle or carriage 37 and extending therein to a hose connection fitting 73 for attachment with a preferably flexible discharge hose 75 leading from the carriage 37 to a hydraulic fluid receiving chamber or sump 77, which may be formed in or mounted on the support frame 21 of the machine, or on a support base upon which the frame 21 is mounted.

Beneath the chamber 61 the block 59' may be formed with a cylindrical channel 79 extending transversely therethrough and opening at the opposite sides of the block. Fluid flow ducts, including a medially disposed inlet duct 81 and a pair of fluid delivery and return ducts 83, 83', spaced apart on opposite sides of the inlet duct 81, are formed in the block 59', between the channel 79 and the bottom face of the block, in position to connect the ducts 83, 83', with the ducts 57, 57', and to connect the inlet duct 81 with a fluid inlet channel 85 formed in the carriage 37 and extending therein to a hose connection fitting 87 adapted for attachment to a flexible hose 89 leading to the discharge side of a pump 91, the suction side of which is connected through a conduit 93 with the sump 77 to draw liquid therefrom and deliver the same under pressure through the hose 89 and the ducts 85 and 81 in the channel 79 at a pressure determined by the adjustment of a pressure regulating valve 97, which may be connected between the suction and discharge sides of the pump 91.

Selectively operable valve means is provided for interconnecting the fluid inlet duct 81 with either of the fluid delivery and return ducts 83 and 83', and to isolate the inlet duct from both, means being provided for connecting each of the fluid delivery and return ducts with the chamber 61 when the other delivery and return duct is connected with the fluid inlet duct 81. To these ends, the selectively operable valve means may comprise a rod 99 forming a valve stem sized to snugly fit within the channel 79 for axial sliding movement therein. The rod may extend at its opposite ends outwardly of the channel and may be circumferentially grooved, inwardly of its opposite ends, to receive resilient seal rings 101 in position for sealing engagement with the surfaces of the channel 79 inwardly of its opposite ends in all axially adjusted positions of the rod 99 therein.

Between the seal rings 101, the outer portions of the rod 99 may be cut away to a substantial depth, as at 103, 103', in order to provide a pair of spaced apart cylindrical lands 105 and 105' in position to register with and close the fluid delivery and return ducts 83 and 83', when the rod 99 is in centered position in channel 79, the arrangement providing a medial fluid transfer chamber 107 within the channel 79 and around the cut-away portion 103 of the rod, which chamber is at all times in open communication with the inlet duct 81. The arrangement also provides chambers 109 and 109' surrounding the cut-away rod portions 103' within the channel 79 and respectively on the sides of the lands 105 and 105' remote from the medial chamber 107.

As a consequence, when the rod 99 is in the centered position shown in FIG. 12, fluid under pressure delivered from the source 91 through the duct 81 and into the chamber 107 will be retained therein, as a result of the snug sliding fit of the lands 105 and 105' in the channel 79, and hence will be prevented from entering either of the fluid delivery and return ducts 83, 83', for delivery thence through the ducts 57 and 57' to the table driving cylinder-piston unit 45.

By moving the rod 99 axially in the channel 79, either of the fluid delivery and return ducts 83, 83', may be placed in open communication with the fluid inlet connected chamber 107, while the other fluid inlet and return duct is connected with its corresponding chamber 109 or 109', means being provided for connecting the chambers 109 and 109' with the fluid return cavity 61 so that, when fluid under pressure is applied from the source 91 through the inlet duct 81 and chamber 107 and thence through one of the ducts 83, 83', and through the connected duct system in the carriage 37 and into the cylinder 49 on one side of the piston 53, to move the same and the table in one direction, fluid may be returned from the cylinder, on the opposite side of the piston, through the other of the delivery and return ducts 83, 83', and through the chamber 61, and thence, by way of the interconnected outlet ducts 69 and 71 and the hose 75, to the sump 77.

Regulation of the speed of table movement, under the driving influence of the cylinder-piston unit 45, is accomplished by the provision of means for adjustably controlling the rate at which fluid is returned, through one or other of the ducts, 83, 83', to the chamber 61 and thence to the sump, since the piston 53 can be moved to drive the table only at a rate of speed permitted by the rate of return flow of fluid from the cylinder 49 to the sump. To this end, a pair of duct systems is provided in the block 59' for delivering return fluid from the ducts 83, 83' through the chambers 109, 109' to the chamber 61, said duct systems including valve means therein for regulating in desired fashion the rate of flow of fluid from the chambers 109, 109' to the fluid return chamber 61.

As shown, these duct systems may comprise bores 111 and 111' drilled downwardly from the upper surface of the block 59', in spaced apart preferably parallel relation, said bores terminating inwardly of the lower surface of the block and being disposed in position intercepting the channel 79 respectively at the chambers 109 and 109', whereby said chambers are at all times in open communication with the lower ends of the bores 111 and 111'. The upper ends of said bores may be sealed in any suitable or preferred fashion, as by means of screw-threaded closure plugs 113. Each of the bores 111 and 111' may communicate with the chamber 61 through corresponding connecting ducts 115, 115', which may open into the chamber 61 through needle valve seats 117, 117' adapted to cooperate with needle valve stems 119, 119' that are adjustable to control the rate of flow of fluid through the bores 111, 111' and the connecting ducts 115, 115' into the chamber 61.

The needle valve stems may conveniently pass through channels 121, 121' disposed in alinement with the ducts 115, 115' and extending between the front wall of the block 59' and the wall of the chamber 61 opposite the valve seats 117, 117', the outer end of the channels 121, 121' being formed with enlarged sockets 123, 123' for the screw fitted reception of needle valve supporting glands 125, 125'. The needle valve stems 119, 119' preferably have screw-threaded portions 127, 127' threadedly connected in and extending through and outwardly of the glands 125, 125', means such as manually operable knobs or hand wheels 129, 129' being connected on the valve stems outwardly of the glands 125, 125' to permit adjustment of the valve stems in the seats 117, 117' to regulate the rate of fluid flow from the chambers 109, 109', through the bores 111, 111' and ducts 115, 115', into the chamber 61.

The block 59' is also provided with by-pass conduit means operable to permit fluid flow at a rapid, relatively unrestricted rate from the ducts 83, 83' through the chambers 109, 109' and the bores 111 and 111' into the chamber 61, in manner by-passing the flow regulating needle valves. To this end, the block 59' may be provided with a pair of preferably axially alined transverse delivery ducts 131, 131', drilled in the block 59' from each of the opposite sides thereof toward the central portions of the block, the ducts being drilled in position respectively intersecting the bores 111, 111', preferably at right angles, at the junction thereof with the ducts 115, 115', the outer ends of the bores 131, 131' being closed, as by means of screw-threaded plugs 133, 133'. Inwardly of their intersection with the bores 111 and 111', the delivery ducts 131 and 131' are respectively connected with the chamber 61 through channels 135 and 135' formed in the block 59' in position providing lateral communication with the ducts 131, 131', and opening into the chamber 61.

The channels 135 and 135', as shown more particularly in FIG. 10 of the drawings, extend in the block 59', respectively above and below the ducts 131, 131', so that the lower side of the channel 135 and the upper side of the channel 135' respectively intersect the upper side of the duct 131 and the lower side of the duct 131'. A pair of parallel adjacent channels 137 and 139, preferably separated by an intervening partition 141, are formed in the rear table facing side of the block 59', the channels being preferably of rectangular sectional configuration. The channels 137 and 139 are disposed in position to register the channel 137 with the T-slot opening 31 of the table, and to register the channel 139 with a flange 33 of the table which defines one side of the T-slot opening 31. The channels 135 and 135' extend in the block 59', from the bottom of the channel 137, toward and open into the chamber 61, the channels being sized and configurated to slidingly receive axially movable fluid flow control members 143 and 143' selectively operable to permit or to prevent the flow of fluid, directly from the bores 111 and 111', into the chamber 61 through the transverse bores 131, 131' and the connected channels 135, 135', which form separate flow channels between the chamber 61 and the bores 111 and 111', in addition to the connecting ducts 115, 115'.

To this end, the axially movable flow control members 143 and 143' may be provided with actuating heads 145, 145' extending in the channel 137 inwardly of the heads 145 and 145'. The flow control members are sized to form snug sliding interfitment in the channels 135 and 135', the members preferably being formed with peripheral grooves 147 for the reception of circumferentially extending seal rings. The peripheral portions of the members 143, 143' are cut away to form valve closing portions 149 of reduced diameter within the channels 135, 135', the inner chamber connected ends 151 of which are of reduced diameter, corresponding with the diameter of the valve closing portions 149, between chamber 61 and the places of connection of the channels 135, 135' with the ducts 131, 131'. The valve closing portions 149 are thus sized to sealingly interfit in the channel portions 151 of reduced diameter and close the same against fluid flow therethrough whenever the members 143, 143' are axially depressed to dispose their portions 149 within the channel portions 151. The valve closing portions 149 are preferably provided with circumferential grooves 153 for mounting seal rings in position for sealing engagement with the channel portions 151, when the members 143, 143' are in valve closing position.

Inwardly of the valve closing portions 149, the members 143 and 143' may be provided with stem portions 155 of reduced diameter substantially less then the diameter of the channel portions 151, whereby the stem portions 155 may extend into the chamber 61 through the channel portions 151 without impeding fluid flow therethrough around said stem portions when the members 143 and 143' are in retracted valve open position. The terminal ends of the stem portions 155 may provide biasing spring seats 157 for engagement with the ends of preferably helical biasing springs 159, the opposite ends of which are seated in cavities 161 formed in the wall of the chamber 61 in coaxial alinement with the stem portions 155.

The springs 159 may operate in compression to normally urge the members 143, 143' axially toward the retracted valve open position shown in FIG. 11 of the drawings. When in such position fluid may flow rapidly and in unimpeded fashion from the ducts 83, 83' and connected chambers 109, 109' through the bores 111, 111' and thence through the channels 135, 135' into the chamber 61; but such unimpeded fluid flow may be completely blocked by depressing the members 143, 143' against the influence of the bias springs 159 to apply the valve portions 149 in valve closed position in the channel portions 151 of restricted diameter. When fluid flow into the chamber 61 is thus blocked by the valve closing portions 149, it will be seen that the return flow of fluid through the bores 111, 111' to the chamber 61 may then occur only through the ducts 115, 115' under the control of the flow regulating valves 119, 119'.

In order to provide for actuating the members 143, 143' to close the flow control valves during desired periods of movement of the table 23, the present invention contemplates the provision of means for mounting actuating cams 163, 163' upon the table 23. For such purpose, mounting brackets 165, 165' may be provided for attaching the cams on the table 23 in position to bear upon the heads 145, 145' of the valve members 143, 143', in order to depress the same at desired intervals during the traveling movement of the table 23 with respect to the control unit 47. The cams 163 may conveniently comprise elongated bars 167, as of steel, preferably having rectangular sectional configuration and a cut-out corner groove 169 extending longitudinally of the bar. At one end each of the cam bars 163, 163' may be formed with a curved nose 171 joining the groove remote side of the bar with the grooved side thereof to provide cam surfaces adapted to engage the heads 145, 145' of the valve members and ride thereon while depressing the same as the table mounted cam members move acrosss the rear side of the unit 47.

The brackets 165 and 165' are adapted to secure the cam members 163, 163' in the T-slot opening 31, along the forward edge of the table 23. Both of the brackets may be formed with ribs 173, 173' adapted to extend in the T-slot opening 31, and the brackets are respectively formed each with a grove 175, 175' adjacent its rib 173, 173'. The grooves 175, 175' are sized to snugly receive and seat the cam members 163 and 163'.

It should be noted that the rib 173 of the bracket 165 and the rib 173' of the bracket 165' respectively are disposed above and below their corresponding cam mounting groove 175, 175'. The upper side of the rib 173 and the lower side of the rib 173', accordingly, are respectively disposed in position to engage the upper and lower flanges 33 of the table which define the opening of the T-slot 31. The cam members 163 and 163', accordingly, may be mounted in the grooves 175 and 175' in position with the grooves 169 of the member 163 facing outwardly and downwardly in position to engage the lower flange 33 of the table which defines the T-slot opening 31, while the slot 169 of the cam member 163' faces outwardly and upwardly in position to engage the upper table flange 33 which defines the T-slot opening 31. As a consequence, when the cam members 163 and 163' are mounted in the brackets 165 and 165', the notched portions of each member together with the rib of the bracket in which mounted extend in and fill the T-slot opening 31.

The cam members 163 and 163' may be clampingly secured in the grooves 175, 175' by means of clamping screws 177, 177' which extend in threaded openings 179, 179' formed in the brackets, between the tops thereof and the mounting grooves. The cam members thus may be secured in any desired longitudinally adjusted position in the brackets. The brackets and the cam members mounted therein also may be secured in any desired position adjusted longitudinally of the table 23, by means of clamping plates 181 of preferably rectangular configuration and sized for free sliding interfitment in the enlarged interior portions 32 of the T-slot 31, the brackets and cam members being clampingly secured to the plates 181, as by means of clamping studs 183 applied through the brackets and rib portions 173, 173' thereof to clamp said ribbed portions and the protruding notched portions of the cam members against the plates 181 and upon the T-slot defining flanges 33 of the table.

As a consequence of the foregoing arrangement, the cam blades 163, 163', when mounted on the table, will be relatively offset, the one above the other in position registering respectively with the vertically offset heads 145 and 145' of the valve members 143 and 143'. Accordingly, as the table moves in one direction, say, toward the left viewing FIG. 1 of the drawings, it may initially travel at the relatively rapid rate permitted by the free flow of fluid into the chamber 61 past the open valve member 143; and such relatively rapid movement may continue until the cam member 163 engages and depresses the head of the member 143, thereby blocking liquid flow into the chambers 161 and causing further movement of the table to take place at a rate of speed determined by the restricted flow of fluid into the chambers 61 under the control of the needle valve 119. In like fashion, the speed of movement of the table in the opposite direction at successively rapid and slow regulated speed may be accomplished under the control of valve member 143' actuated by the cam 163' and under the control of the needle valve 119'.

An outwardly projecting end of the valve rod 99 may be connected with suitable actuating means, such as a manually operable handle 185, for shifting the rod 99 in one direction or the other from the neutral position shown in FIG. 12, in order to initiate movement of the table 23 in one direction or the other under the driving influence of the hydraulic cylinder-piston unit 45. In this connection, the manually operable handle 185 may conveniently comprise a lever movably connected in any suitable fashion upon the frame of the control unit 47, the lever in turn being pivotally connected, as by means of a pin 186, with an actuating yoke 187 to which the projecting end of the valve rod 99 is secured outwardly of the block 59'.

As shown more particularly in FIGS. 13 and 14 of the drawings, cover members 189 may be mounted on the block 59', in position to enclose the opposite sides thereof. These cover members may each comprise interconnected top, front and outer side walls 191, 191', 193, 193' and 195, 195'. The upper face of the block 59' may be cut back along each side of the block to form mounting seats 197, 197', and the top walls 191, 191' of the cover members may be formed with mounting flanges 199, 199', sized and shaped to fit the seats 197, 197'. Fastening screws 201 may be employed to secure the flanges 199, 199' in the seats 197, 197', to thereby mount the cover members on the block 59'. The top wall 191' of one of the cover members may be formed with a dependent mounting pedestal 203 upon which one end of the lever 185 may be pivotally mounted, as by means of a pivot pin 205. The lever may extend outwardly of the cover member 189' through a slot 207 formed in the front and side walls 193' and 195', the outwardly extending portions of the lever being preferably formed with a grasping handle 209.

To hold the valve rod 99 in position relatively shifted in either direction from the neutral position shown in FIG. 12, and to release the rod for return to such neutral position, as at the conclusion of a table shifting cycle, the present invention provides improved latching and releasing means 211 comprising a detent assembly 213 movably mounted in the block 59' and drivingly connected with the yoke 187 and hence with the valve rod 99, and latching means 215 mounted in the block 59' in position for selective latching engagement with the unit 213, the latching means being operable at intervals to release the unit.

As shown, the unit 213 comprises a central stem 217 forming a control rod having opposite end portions 219, 219' of reduced diameter, the portion 219 having a screw-threaded extension 220 for connection with the yoke 187. The end portions 219, 219' are snugly enclosed by and within externally threaded sleeves 221, 221'. The central stem 217 is snugly enclosed within a helical spring 223 which extends at its opposite ends in position snugly embracing and threadingly secured to the inner ends of the sleeves 221, 221'. The stem 217 and the spring 223 are enclosed within sleeve elements which snugly enclose the spring, said sleeve elements including a central sleeve 225 forming a mounting member embracing a central portion of the spring, and end sleeves 227, 227', having skirt portions 229, 229' snugly embracing the opposite ends of the spring outwardly of the opposite ends of the central sleeve, and portions 231, 231' secured on the sleeves 221, 221', clamping nuts 233, 233' being applied upon the sleeves 221, 221' outwardly of the ends of the sleeves 227, 227'.

The unit 213 is mounted slidably within a channel 235 formed in the block 59' in spaced parallel relation with respect to the channel 79, the channel 235 extending between and opening at its opposite ends at the opposite sides of the block 59'. Means is provided for anchoring the central sleeve or mounting member 225 in any one of several axially adjusted positions, against axial sliding movement in the channel 235. To this end, the sleeve may be provided with a plurality of axially spaced circumferential grooves, including a medial groove 237 and at least a pair of grooves 237' equally spaced upon opposite sides of the medial groove. The block 59', as shown more particularly in FIG. 10 of the drawings, may be formed with an internally threaded bore 239 extending from the top face of the block 59' and intersecting the channel 235 medially between the opposite side walls of the block. A threaded anchoring stud 241 extends in the channel 239, the inner end of the stud 241 forming a tip 241' adapted for reception in any selected one of the grooves 237 in order to secure the sleeve 225 against axial movement in the channel 235 in axially adjusted position determined by the engagement of the tip of the stud 241 in a selected groove. The tip remote end of the stud 241 may extend at the upper face of the block 59' and may be formed with a slot or cavity 243 for the reception of a tool, such as a screwdriver or socket wrench, to facilitate the turning of the stud 241 in anchoring and releasing the sleeve 225, the cover plate 63 being provided with an opening 245 to permit insertion of the turning tool into engagement with the cavity 243, a resilient sealing gasket or ring 247 being provided around the opening 245.

The latching means 215 comprises a pair of generally L-shaped levers 249, 249', mounted for rocking movement in an elongated slot 251 formed in the block 59' and opening upon the channel 235 and into the groove 139, centrally thereof, the levers being mounted for rocking movement upon parallel, spaced apart pivot pins 253, 253' extending across the slot 251 and mounted in the block 59' on the opposite sides of the slot. The levers 249, 249' have oppositely extending arms 255, 255' disposed alongside of the sleeves 225, 227 and 227', and generally parallel arms 257, 257' having ends extending in the groove 139, the facing surfaces of said ends being formed with sockets 258, 258', for seating the opposite ends of a preferably helical compression spring 259, which serves to urge the levers 249 in opposite directions on the pivot pins 253, whereby to press the oppositely extending arms 255 of the levers upon the sleeve members 227, 227' of the unit 213.

When the actuating means 185 is moved to shift the valve rod 99, in one direction or the other, to connect the inlet duct 81 with one or other of the supply and return ducts 83, 83', the yoke 187 will move the stem portions 217, 219 and 219' in one of the sleeves 227 and 227', in unison with the valve rod 99, the sleeve 225 and the other of the sleeves 227 or 227' being held stationary by the engagement of the pin 241 in the sleeve groove 237. The spring 223 will yield to permit one of the sleeves 227, 227' to move away from the abutting end of the anchored sleeve 225 and beneath the latching end of the lever arm 255 or 255' with which the so moved sleeve 227 or 227' is associated. The so moved sleeve will be shifted beyond the end of its associated latching lever arm 255 or 255', as the valve rod 99 reaches its shifted position in which the inlet duct 81 is connected with one or other of the supply and return ducts 83, 83', so that the pivot remote end of the lever arm 255 or 255' may latchingly engage the central sleeve facing end of the so sifted sleeve 227 or 227' and thereafter hold it in shifted position until the latching lever is turned against the influence of the spring 259 to release the latched sleeve for return, under the influence of the spring 223, into engagement with the facing end of the anchored sleeve 225.

In order to trip the latch levers 249, 249' and thus permit the valve rod 99 to return to normal centered position preventing further movement of the table, a latch actuating bar 261, preferably of square sectional configuration is mounted for longitudinal movement in the groove 139, the bar being sized for snug yet freely slidable interfitment in said groove. The bar is formed medially with a cut-out cavity 263 on one side thereof for accommodating the spring 259 and the spring mounting ends of the lever arms 257 and 257' in said cavity, the opposite ends of the cavity defining latch actuating shoulders 265, 265' abutting the outwardly facing sides of the spring mounting ends of the lever arms. The opposite ends 267, 267' of the bar extend outwardly of the walls 195, 195' of the cover members 189, 189', in position to register with the lower ends 166, 166' of the cam mounting brackets. Consequently, as the table, when driven in one direction or the other, as the result of operation of the actuating member 185, reaches a position where one or other of the brackets engages the corresponding end 267 or 267' of the latch release bar 261, the bar will be moved by the bracket in a direction to release the corresponding latch 249 or 249' and allow the spring 223 to return the valve rod 99 to its normal position, thereby stopping the movement of the table. The lower portions of the brackets may be formed with threaded openings 168, 168' in alinement with the ends of the bar 261, for mounting bar engaging buffer buttons which may conveniently comprise headed bolts. The lower portions of the brackets may also be formed with openings 170, 170' for mounting headed bolts on the brackets in position to engage the opposite sides of the saddle 37 immediately below the bar 261, and form positive means to stop table movement at the limit of its travel in either direction.

It will be seen from the foregoing that table travel in either direction may be controlled at initially fast and finally slow regulated speed; and that table movement may be automatically stopped when the desired table travel limit shall have been reached. The desired controlled movement of the table may be accomplished merely by moving the control member 185 in one direction or the other from its neutral position.

By anchoring the latching unit 213 in either of its axially shifted positions, with the lock pin 241 extending in one or other of the grooves 237', the valve rod 99 will be held in one or other of its axially shifted positions, connecting the inlet opening 81 with one or other of the inlet and return ducts 83, 83'. The table 23, accordingly, will be normally held by fluid pressure in a starting position at the limit of its travel in one direction or the other. One of the levers will be resting upon the adjacent end of the central sleeve 225. The other lever will be resting upon the skirt of its associated sleeve 227 or 227'. The control member 185 will be disposed in an initial position at the limit of its shifting movement from neutral position, in one direction or the other. By shifting the member 185 from its said initial position, through the neutral position to a shifted actuating position at the limit of its shifting movement in the other direction, the cycle of fast and slow table movement will be started in operation, with one of the latch levers 249 or 249' in latching engagement with its associated sleeve 227 or 227', thereby retaining the valve rod 99 in such shifted actuating position to move the table to a position in which operation of the latch tripping bar 261 will release the latch and permit the valve rod to return to its initial position, thereby causing the table to be returned automatically to its starting position.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Hydraulic apparatus for driving a movable member by applying fluid under pressure selectively in either one of a pair of fluid delivery and return conduits, while delivering fluid from the other of said conduits to a discharge receiver, at a regulated rate, to determine the rate of speed at which the member is driven, comprising an axially shiftable valve stem disposable selectively in position to block fluid flow, from a supply source of fluid under pressure, to both of said conduits, and in positions to deliver fluid under pressure to either of said conduits, while the other is connected with said receiver, a control rod connected to and movable with the valve stem on an axis parallel to and spaced from the axis of the valve stem, spring means normally urging said control rod to move the valve stem toward a selected one of said positions, latch means operable to retain said control rod in position holding the valve stem shifted from said selected position during travel of the movable member, and means operable to release the latch means when the movable member reaches a terminal position during its travel.

2. Hydraulic apparatus for driving a movable member by applying fluid under pressure selectively in either one of a pair of fluid delivery and return conduits, while delivering fluid from the other of said conduits to a discharge receiver, at a regulated rate, to determine the rate of speed at which the member is driven, comprising an axially shiftable valve stem disposable selectively in position to block fluid flow, from a supply source of fluid under pressure, to both of said conduits, and in position to deliver fluid under pressure to either of said conduits, while the other is connected with said receiver, means to yieldingly support said valve in any selected one of its several relatively shifted positions including a mounting member shiftable on an axis parallel to and spaced from the axis of the valve stem, and positionable selectively in control positions corresponding with the several shifted positions of the valve, means to anchor the mounting member in said control positions, spring means supported on said mounting member for normally urging the valve stem toward the selected valve position corresponding with the control position in which the mounting member is anchored, latch means operable to retain said valve stem in position shifted from said selected position during travel of the movable member, and means operable to release the latch means when the movable member reaches a terminal position during its travel.

3. Hydraulic apparatus for driving a movable member by applying fluid under pressure selectively in either one of a pair of fluid delivery and return conduits, comprising a frame forming a channel, a pair of spaced ducts opening into said channel and formed for connection respectively with said conduits, an inlet duct opening into said channel between said spaced ducts and formed for connection with a source of fluid under pressure, a valve rod snugly fitting and axially movable within said channel and formed with axially spaced pockets, including a medial pocket and side pockets disposed outwardly of each end of the medial pocket, said valve rod forming sealing lands at the opposite ends of the medial pocket and between it and each of the side pockets, said lands being sized to sealingly cover both of said spaced ducts when the rod is in flow blocking position with the medial pocket open to the inlet duct, said frame being formed with spaced fluid discharge conduits opening into said channel in position to communicate respectively with said side pockets, said rod being movable in either direction from said flow blocking position to flow permitting positions in which each of said spaced ducts may be selectively connected with the inlet duct through the medial pocket, while the other is connected with its corresponding discharge conduit through its associated side pocket, biasing means normally urging the valve rod toward one of its flow controlling positions and yieldable to permit axial movement of the rod to a shifted flow controlling position, latch means to hold the rod in said shifted position, and means operable to release the latch means when the movable member reaches a latch releasing position.

4. Hydraulic apparatus for driving a movable member by applying fluid under pressure selectively in either one of a pair of fluid delivery and return conduits, comprising a frame forming a channel, a pair of spaced ducts opening into said channel and formed for connection respectively with said conduits, an inlet duct opening into said channel between said spaced ducts and formed for connection with a source of fluid under pressure, a valve rod snugly fitting and axially movable within said channel and formed with axially spaced pockets, including a medial pocket and side pockets disposed outwardly of each end of the medial pocket, said valve rod forming sealing lands at the opposite ends of the medial pocket and between it and each of the side pockets, said lands being sized to sealingly cover both of said spaced ducts when the rod is in flow blocking position with the medial pocket open to the inlet duct, said frame being formed with spaced fluid discharge conduits opening into said channel in position to communicate respectively with said side pockets, said rod being movable in either direction from said flow blocking position to flow permitting positions in which each of said spaced ducts may be selectively connected with the inlet duct through the medial pocket, while the other is connected with its corresponding discharge conduit through its associated side pocket, a mounting member secured on the frame, a driving member connected with said valve rod and shiftable on the mounting member in either direction axially of said rod from a neutral position to a shifted position, means yieldingly biasing said driving member toward said neutral position to normally urge said rod toward one of its flow controlling positions, means operable to move the rod and driving member from said neutral toward said shifted position, latch means on said frame and driving member to retain said rod and driving member in said shifted position, and means operable to release the latch means when the movable member reaches a latch releasing position.

5. Hydraulic apparatus as set forth in claim 4, wherein the mounting member is adjustable on the frame, in a direction axially of the valve rod, in adjusted positions corresponding with the several flow controlling positions of the rod, and means to anchor the mounting member in any desired axially shifted position to normally hold the rod yieldingly in its corresponding flow controlling positions.

6. Hydraulic apparatus as set forth in claim 4, wherein said mounting member is a sleeve axially movable in a guideway formed in the frame parallel with said channel, and an anchor member on said frame and operable to engage the sleeve at spaced anchoring stations thereon to secure the mounting member in any selected position of adjustment axially of the channel.

7. Hydraulic apparatus as set forth in claim 4, wherein said mounting member is a sleeve axially movable in a guideway formed in the frame parallel with said channel, an anchor member on said frame and operable to engage the sleeve at spaced anchoring stations thereon to secure the mounting member in any selected position of adjustment axially of the channel, said driving member comprising a stem axially movable within and extending outwardly of the opposite ends of said sleeve, a pair of collars slidably mounted on said stem outwardly of the ends of the sleeve, spring actuated means yieldingly urging said collars together on said stem and into seating engagement with the opposite ends of the sleeve, and cooperating stops on the collars and stem limiting movement of said collars on said stem under the influence of said spring actuated means.

8. Hydraulic apparatus as set forth in claim 4, wherein said mounting member is a sleeve axially movable in a guideway formed in the frame parallel with said channel, an anchor member on said frame and operable to engage the sleeve at spaced anchoring stations thereon to secure the mounting member in any selected position of adjustment axially of the channel, said driving member comprising a stem axially movable within and extending outwardly of the opposite ends of said sleeve, a pair of collars slidably mounted on said stem outwardly of the ends of the sleeve, spring actuated means yieldingly urging said collars together on said stem and into seating engagement with the opposite ends of the sleeve, cooperating stops on the collars and stem limiting movement of said collars on said stem under the influence of said spring actuated means, whereby one of the collars may be moved, against the influence of said spring actuated means, to a cocked position, away from its seating end of the sleeve, when the stem and attached valve rod is moved from the neutral to a shifted position, and a spring pressed latch on said frame in position to latchingly engage and hold the collar in cocked position.

9. Hydraulic apparatus as set forth in claim 4, wherein said mounting member is a sleeve axially movable in a guideway formed in the frame parallel with said channel, an anchor member on said frame and operable to engage the sleeve at spaced anchoring stations thereon to secure the mounting member in any selected position of adjustment axially of the channel, said driving member comprising a stem axially movable within and extending outwardly of the opposite ends of said sleeve, a pair of collars slidably mounted on said stem outwardly of the ends of the sleeve, spring actuated means yieldingly urging said collars together on said stem and into seating engagement with the opposite ends of the sleeve, cooperating stops on the collars and stem limiting movement of said collars on said stem under the influence of said spring actuated means, whereby one of the collars may be moved, against the influence of said spring actuated means, to a cocked position, away from its seating end of the sleeve, when the stem and attached valve rod is moved from the neutral to a shifted position, a spring pressed latch on said frame in position to latchingly engage and hold the collar in cocked position, and a shiftable member operable to release the latch when the movable member reaches a latch releasing position.

References Cited by the Examiner
UNITED STATES PATENTS

| | | | |
|---|---|---|---|
| 2,200,396 | 5/1940 | Martin | 251—97 |
| 2,320,905 | 6/1943 | Bateholts | 251—297 |
| 2,331,108 | 7/1940 | Ganahl | 91—358 |
| 2,552,848 | 5/1951 | Gabriel et al. | 137—625.69 |
| 2,573,761 | 11/1951 | Firth | 251—97 |
| 2,610,614 | 9/1952 | Sedguick | 91—382 |
| 2,745,385 | 5/1956 | Shuff | 91—389 |
| 2,893,354 | 7/1959 | Austin et al. | 91—407 |
| 2,971,535 | 2/1961 | Weaver | 137—625.69 X |
| 3,015,309 | 1/1962 | Austin | 91—407 |

SAMUEL LEVINE, *Primary Examiner.*

FRED E. ENGELTHALER, *Examiner.*